United States Patent [19]
Journee

[11] Patent Number: 5,980,147
[45] Date of Patent: Nov. 9, 1999

[54] SCREEN WIPER MECHANISM COMPRISING A CRANK AND CONNECTING ROD COUPLED TOGETHER BY AN IMPROVED ARTICULATING DEVICE

[75] Inventor: Maurice Journee, Reilly, France

[73] Assignee: Paul Journee S.A., Colombes, France

[21] Appl. No.: 08/425,149

[22] Filed: Apr. 19, 1995

[30] Foreign Application Priority Data

Apr. 26, 1994 [FR] France .................................. 94 05027

[51] Int. Cl.⁶ .................................................. F16C 11/00
[52] U.S. Cl. ........................... 403/119; 403/23; 403/279;
403/284; 403/388; 403/390; 15/250.3; 15/250.31
[58] Field of Search ............................ 15/250.3, 250.31;
403/23, 119, 279, 282, 284, 384, 388, 390;
411/185, 186, 187, 504, 505, 506, 507,
535, 536, 544

[56] References Cited

U.S. PATENT DOCUMENTS

| | | | |
|---|---|---|---|
| 942,743 | 12/1909 | Prickett | 15/250.3 |
| 1,203,684 | 11/1916 | Ayotte | 15/250.31 X |
| 2,393,194 | 1/1946 | Sacchini | 15/250.3 |
| 2,575,311 | 11/1951 | Barry, Jr. et al. | 403/388 X |
| 3,135,982 | 6/1964 | Carlisle | 15/250.3 |
| 3,829,924 | 8/1974 | Dittrich et al. | 15/250.14 |
| 3,845,998 | 11/1974 | McElhinney et al. | 308/36.1 |
| 3,958,389 | 5/1976 | Whiteside et al. | 403/282 X |
| 4,263,821 | 4/1981 | Savage et al. | 15/250.31 X |
| 4,417,651 | 11/1983 | Lu | 403/282 X |
| 5,015,136 | 5/1991 | Vetter et al. | 411/504 |
| 5,479,077 | 12/1995 | Kline et al. | 15/250.31 X |
| 5,553,962 | 9/1996 | Eustache | 403/154 |
| 5,621,943 | 4/1997 | Berge et al. | 15/250.34 |

FOREIGN PATENT DOCUMENTS

| | | | |
|---|---|---|---|
| 1546319 | 11/1968 | France . | |
| 2143398 | 2/1973 | France . | |
| 2705936 | 12/1994 | France . | |
| 1575454 | 4/1967 | Germany . | |
| 1385789 | 2/1975 | United Kingdom | 15/250.31 |
| 2088707 | 6/1982 | United Kingdom | 15/250.3 |

*Primary Examiner*—Brian K. Green
*Assistant Examiner*—Andrea Chop
*Attorney, Agent, or Firm*—Morgan & Finnegan, L.L.P.

[57] ABSTRACT

The screen wiper mechanism has a crank, a connecting rod, a pivot pin and an articulating device which couples the crank to the connecting rod. The structure has, in succession: a head which bears against an engagement surface that is formed, in facing relationship with the head, in a first lateral face of the connecting rod. A cylindrical first shank portion and a cylindrical second shank portion that is of smaller diameter than the first shank portion forms an extension to the first shank. The articulating device also has structure that secures the crank on the second shank portion of the pivot pin against relative axial movement and takes up axial clearance. This structure, moreover, is arranged to be compressed while fastening the structure together during assembly.

9 Claims, 1 Drawing Sheet

SCREEN WIPER MECHANISM COMPRISING A CRANK AND CONNECTING ROD COUPLED TOGETHER BY AN IMPROVED ARTICULATING DEVICE

FIELD OF THE INVENTION

This invention relates to a screen wiper mechanism, and more particularly to a screen wiper mechanism of the type that comprises an articulating device which couples pivotally together a crank and connecting rod of the mechanism, by means of a pivot pin.

BACKGROUND OF THE INVENTION

One example of such a screen wiper mechanism, being especially of the type giving non-circular wiping, is described and shown in French published patent specification No. FR 1 546 319A. An improved articulating device for such a mechanism is the subject of French patent application No. 93 06724 filed on Jun. 4, 1993. In that improvement, the screen wiper mechanism is of the type which has an articulating device in which the connecting rod is coupled to the crank by means of a rotary pin. This pin has a head, a first cylindrical shank portion, and a second cylindrical shank portion of smaller diameter than the first shank portion. The head and the two shank portions are coaxial with each other, and the pin is of the type in which the first shank portion extends through a sleeve which is located within the connecting rod, while the second shank portion extends through a reinforcing element carried by the crank. The connecting rod carries at least one friction ring, and this ring, or at least one of these rings, is held against rotation with respect to the connecting rod.

In that arrangement, the friction rings, which are made of a suitable friction material in order to ensure their satisfactory operation, have to be gripped axially against the surfaces in facing relationship with them.

Given manufacturing tolerances in the various components of the articulating device, and in particular manufacturing tolerances of the pivot pin and of the opposed recesses which are formed in the opposed lateral faces of the connecting rod, it is found that proper axial gripping of the friction rings is not necessarily achieved, or may not be achieved to a sufficiently great extent, after assembly of the articulating device. In this connection, the assembly operation includes an operation to fasten the crank in position against axial movement with respect to the connecting rod; and this is achieved by, for example, a pressing operation which deforms the material of the pivot pin so as to form a second head at the free end of the latter, in the manner of a rivet.

DISCUSSION OF THE INVENTION

An object of the present invention is to provide an improved screen wiper mechanism which enables the above mentioned drawbacks to be overcome.

According to the invention, a screen wiper mechanism of the type comprising an articulating device whereby a crank is articulated on a connecting rod, by means of a pivot is shown. The pivot pin has, in axial succession: a head which bears against an engagement surface portion formed in facing relationship therewith in a first lateral face of the connecting rod; a first cylindrical shank portion which extends through a through hole in the connecting rod; and a second cylindrical shank portion, which has a smaller diameter than the first shank portion and which extends the latter, with the second cylindrical shank portion extending through a through hole formed in the crank, together with means for securing the crank against axial movement on the second shank portion of the pivot pin. This is characterised in that the engagement surface portion of the connecting rod includes means for taking up axial clearance, the means being adapted to be compressed during formation of the means for securing the crank against axial movement.

Preferably, the means for taking up axial clearance are formed integrally with the engagement surface portion of the connecting rod.

In such an arrangement, the means for taking up axial clearance preferably comprise at least one projection which is formed in the engagement surface portion of the connecting rod. The projecting element is then preferably in the form of an annular rib.

According to a preferred feature of the invention, a first ring, through which the cylindrical first shank portion of the pivot pin extends, is interposed between the head of the pivot pin and the engagement surface portion of the connecting rod.

According to another preferred feature of the invention, a second ring, through which the cylindrical first shank portion of the pivot pin extends, is interposed between the second lateral face of the connecting rod and a lateral face of the crank in facing relationship therewith.

In that case, in a preferred embodiment, a third ring, through which the cylindrical second shank portion of the pivot pin extends, is interposed between the second ring and the face of the crank in facing relationship with it.

In a preferred version of this arrangement having a third ring, the articulating device includes a sealing cup member comprising a gripping collar portion which is interposed between the third ring and the face of the crank in facing relationship with it, the sealing cup comprising a sealing skirt portion having a free edge cooperating with a portion of the second lateral face of the connecting rod, in facing relationship with it.

According to a further preferred feature of the invention, the engagement surface portion of the connecting rod comprises the base of a recess which is formed in the first lateral face of the connecting rod.

According to yet another preferred feature of the invention, the articulating device includes a sealing cap which is carried by the connecting rod, and which overlies the head of the pivot pin. In that case, an annular sealing ring is preferably interposed between the cap and the first lateral face of the connecting rod.

Further features and advantages of the invention will appear more clearly on a reading of the detailed description that follows. This description is given by way of example only, and with reference to the accompanying drawing.

DESCRIPTION OF A PREFERRED EMBODIMENT OF THE INVENTION

Figure 1:
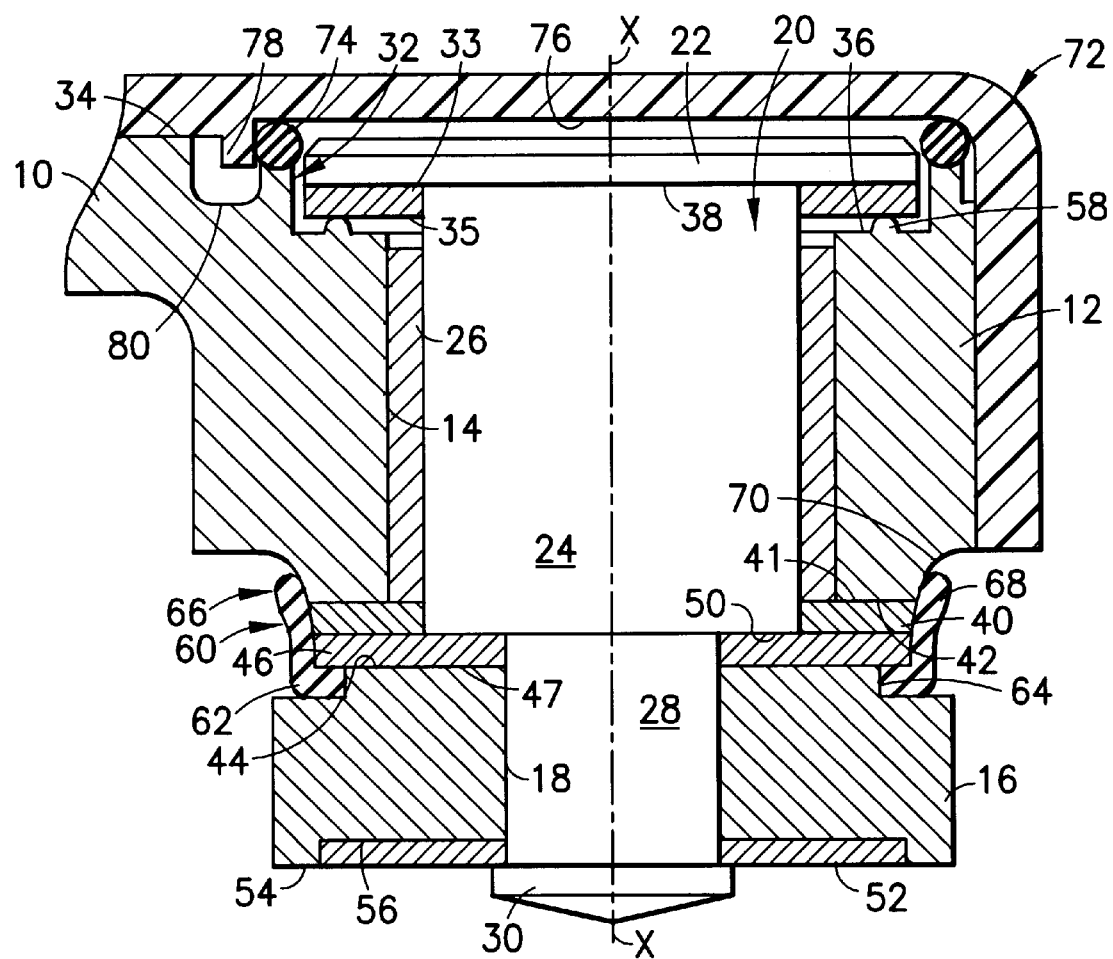
FIG. 1, the single Figure of the drawing is a view in axial cross section showing part of a screen wiper mechanism which includes an articulating device made in accordance with the present invention.

The drawing shows part of the elongated body 10 of a connecting rod, which has an end portion 12. The thickness of the end portion 12 is greater than that of the body 10, and a through hole 14 is formed through the end portion 12.

The connecting rod 10 is part of an articulating mechanism for controlling a screen wiper (not shown) in rotary movement. This articulating mechanism also includes a crank, an end portion of crank 16 of which can be seen in the drawing. Reference is invited to the two prior art documents cited earlier in this specification, for the general design of the screen wiper mechanism of which the articulating device forms part in the current state of the art.

A through hole 18 is formed through the crank 16, and in the assembled state the two through holes 14 and 18 are coaxial with each other. A pivot pin 20, defining a pivot axis X—X, couples the crank 16 with the connecting rod 10, for articulation of the crank on the connecting rod.

The pivot pin 20 has a wide head 22 and a first cylindrical shank portion 24 of large diameter, which extends axially through the through hole 14 in the end portion 12 of the connecting rod, with a sealing ring or sleeve 26 being interposed between them. The pivot pin also has a second cylindrical shank portion 28, of smaller diameter than the first shank portion 24, and an end portion 30. The second shank portion 28 extends axially through the through hole 18 formed in the end portion 16 of the crank, and the end portion 30 is formed by the material of the shank portion 28 being upset in the manner of a rivet head. It will be seen that the pivot pin 20 is a solid of revolution, with its head 22 and shank portions 24 and 28 being coaxial, all about the common axis X—X.

The pivot pin head 22 is received in a recess 32 which is formed in the upper face 34 of the connecting rod 10 by machining. A first friction ring 33 is interposed between the base 36 of the recess 32 and the lower face 38 of the head 22; and a second friction ring 40 is interposed between the lower face 42 of the end portion 12 of the connecting rod and the upper face 44 of the crank 16. The first or larger cylindrical shank portion 24 of the pivot pin 20 extends through the two friction rings 33 and 40.

A third ring 46 is interposed between the second friction ring 40 and the upper face 44 of the crank end portion 16. The second cylindrical shank portion 28, i.e. the smaller shank portion, of the pivot pin 20 passes through the third ring 46, so that the latter bears against the lower radial face or shoulder 50, which is defined between the cylindrical shank portions 24 and 28 of the pivot pin 20.

A fourth ring 52 may be interposed between the lower face 54 of the crank end portion 16 and the end portion 30 of the pivot pin. As shown in the drawing, the fourth ring 52 may be received within a shallow recess 56 formed in the lower face 54 of the crank end portion 16.

In the preferred arrangement according to the invention which is shown in the drawing by way of example, the base 36 of the recess 32 which defines the engagement and clamping surface, with which the lower face 38 of the wide head 22 cooperates indirectly, includes an annular rib or ring element 58, which is made integrally with the connecting rod 10, 12, and which is such that it can be partially or fully compressed during the operation of securing the components of the assembly together by axial pressing.

To this end, the dimensions of the rib 58 are predetermined so as to enable it to be partially or fully compressed by the lower face 35 of the first friction ring 33 while the minor head or end portion 30 is being formed by upsetting. This is done in such a way as to ensure that at the end of the pressing operation there will be no axial clearance between the friction rings 33 and 40 and the surface portions, in facing relationship with them, of the upper face 34 and lower face 42 of the connecting rod 10, 12.

The sleeve 26 can of course have an axial length which is shorter than the distance between the base 36 of the recess 32 and the machined portion of the lower face 42 of the connecting rod end portion 12, against which the upper face 41 of the second friction ring 40 is engaged.

In order to ensure proper sealing of the articulating device, a sealing cup 60 is arranged in its lower part. In this connection, the sealing cup comprises a gripping collar portion 62, which is gripped axially between a radial shoulder 64 formed in the upper face 44 of the crank end portion 16 and the lower face 47 of the third ring 46. The collar portion 62 is extended by an annular skirt portion 66, the free terminal edge 68 of which cooperates sealingly with the portion 70, in facing relationship with it, of the lower face of the connecting rod end portion 12.

Sealing is also provided by a sealing cap 72, which is fixed on the end portion 12 of the connecting rod 10 and which overlies the wide head 22 and the recess 32, with a sealing O-ring 74 being interposed between them.

The lower face 76 of the cap 72 may also be formed with a rib 78, which is received in a groove 80 in facing relationship with it, the groove 80 being formed in the upper face 34 of the connecting rod end portion 12, so as to provide a sealing labyrinth.

The invention is not limited to the embodiment described above. The means whereby the axial clearance, defined between the wide head 22 and the engagement surface 36, in facing relationship with it, of the connecting rod end portion 12, is taken up may, in particular, take a number of different embodiments.

In the case where these means are formed integrally with the end portion 12 of the connecting rod 10, they may consist of one or more annular grooves, or a series of pads or projections which are totally or partially compressed during the axial pressing operation.

It is also possible to arrange that the means for taking up the axial clearance are in the form of a separate element such as a metallic ring, which is fitted between the base 36 of the recess 32 and the lower face 35 of the first friction ring 33 during the assembly operation, and which is totally or partially compressed during the axial pressing operations.

What is claimed is:

1. A screen wiper mechanism comprising a crank, a connecting rod, and articulating means for mounting the crank on the connecting rod, the connecting rod having a first lateral face having an engagement surface portion and a first hole having a pivot axis for rotation of the connecting rod in a plane perpendicular thereto formed through the connecting rod, the crank having a second hole formed through the crank, the articulating means including a pivot pin leaving in succession, a head in facing relationship with the engagement surface portion and bearing on the engagement surface portion, a first cylindrical shank portion extending through the first hole, a second cylindrical shank portion, of smaller diameter than the first cylindrical shank portion, defining an extension of the first cylindrical shank portion and extending through said second hole, the articulating means further including means securing the crank on the second shank portion against movement parallel with the pivot axis of the crank with respect to the connecting rod, wherein the connecting rod further includes at least one projecting element formed integrally with the engagement surface portion for taking up axial clearance by being compressed during formation of the securing means.

2. A mechanism according to claim 1, wherein the at least one projecting element is an annular rib.

3. A mechanism according to claim 1, wherein the articulating means further includes a sealing cap carried by the connecting rod and overlying the head of the pivot pin.

4. A screen wiper mechanism comprising a crank, a connecting rod, and articulating means for mounting the crank on the connecting rod, the connecting rod having a first lateral face having an engagement surface portion and a first hole having a pivot axis for rotation of the connecting rod in a plane perpendicular thereto formed through the connecting rod, the crank having a second hole formed through the crank, the articulating means including a pivot pin having in succession, a head in facing relationship with the engagement surface portion and bearing on the engagement surface portion, a first cylindrical shank portion extending through the first hole, a second cylindrical shank portion, of smaller diameter than the first cylindrical shank portion, defining an extension of the first cylindrical shank portion and extending through the second hole, the articulating means further including means securing the crank on the second shank portion against movement parallel with the pivot axis of the crank with respect to the connecting rod, wherein the connecting rod further includes at least one projecting element formed integrally with the engagement surface portion for taking up axial clearance by being compressed during formation of the securing means, further including a first ring through which the first cylindrical shank portion of the pivot pin extends, the first ring being interposed between the head of the pivot pin and the engagement surface portion.

5. A screen wiper mechanism comprising a crank, a connecting rod, a articulating means for mounting the crank on the connecting rod, the connecting rod having a first lateral face having an engagement surface portion and a first hole having a pivot axis for rotation of the connecting rod in a plane perpendicular thereto formed through the connecting rod, the crank having a second hole formed through the crank, the articulating means including a pivot pin having in succession, a head in facing relationship with the engagement surface portion and bearing on the engagement surface portion, a first cylindrical shank portion extending through the first hole, a second cylindrical shank portion, of smaller diameter than the first cylindrical shank portion, defining an extension of the first cylindrical shank portion and extending through the second hole, the articulating means further including means securing the crank on the second shank portion against movement parallel with the pivot axis of the crank with respect to the connecting rod, wherein the connecting rod further includes at least one projecting element formed integrally with the engagement surface portion for taking up axial clearance by being compressed during formation of the securing means, further including a second ring through which the first cylindrical shank portion of the pivot pin extends, the connecting rod having a second lateral face, the crank having a third lateral face in facing relationship with the second lateral face, and the second ling being interposed between the second and third lateral faces.

6. A mechanism according to claim 5, further including a third ring through which the second cylindrical shank portion of the pivot pin passes, the third ring being interposed between the second ring and the third lateral face.

7. A mechanism according to claim 6, wherein the articulating means further includes a sealing cup member comprising a gripping collar portion interposed between the third ring and the third lateral face, and a sealing skirt portion having a free edge, the second lateral face of the connecting rod having a portion in facing relationship, and cooperating, with the free edge.

8. A screen wiper mechanism comprising a crank, a connecting rod, and articulating means for mounting the crank on the connecting rod, the connecting rod having a first lateral face having an engagement surface portion and a first hole having a pivot axis for rotation of the connecting rod in a plane perpendicular thereto formed through the connecting rod, the crank having a second hole formed through the crank, the articulating means including a pivot pin having in succession, a head in facing relationship with the engagement surface portion and bearing on the engagement surface portion, a first cylindrical shank portion extending through said first hole, a second cylindrical shank portion, of smaller diameter than the first cylindrical shank portion, defining an extension of the first cylindrical shank portion and extending through the second hole, the articulating means further including means securing the crank on the second shank portion against movement parallel with the pivot axis of the crank with respect to the connecting rod, wherein the connecting rod further includes at least one projecting element formed integrally with the engagement surface portion for taking up axial clearance by being compressed during formation of the securing means, wherein the connecting rod has a first lateral face, the first lateral face having a recess formed therein, the recess having a base constituting the engagement surface portion.

9. A screen wiper mechanism comprising a crank, a connecting rod, and articulating means for mounting the crank on the connecting rod, the connecting rod having a first lateral face having an engagement surface portion and a first hole having a pivot axis for rotation of the connecting rod in a plane perpendicular thereto formed through the connecting rod, the crank having a second hole formed through the crank, the articulating means including a pivot pin having in succession, a head in facing relationship with the engagement surface portion and bearing on the engagement surface portion, a first cylindrical shank portion extending through the first hole, a second cylindrical shank portion, of smaller diameter than the first cylindrical shank portion, defining an extension of the first cylindrical shank portion and extending through the second hole, the articulating means further including means securing the crank on the second shank portion against movement parallel with the pivot axis of the crank with respect to the connecting rod, wherein the connecting rod further includes at least one projecting element formed integrally with the engagement surface portion for taking up axial clearance by being compressed during formation of the securing means, wherein the articulating means further includes a sealing cap carried by the connecting rod and overlying the head of the pivot pin, further including an annular sealing ring interposed between the sealing cap and the first lateral face of the connecting rod.

* * * * *